Dec. 22, 1925.                                                                  1,566,343
J. V. OSTERHOUT
NUT TAPPING MACHINE
Filed Nov. 25, 1921                3 Sheets-Sheet 1
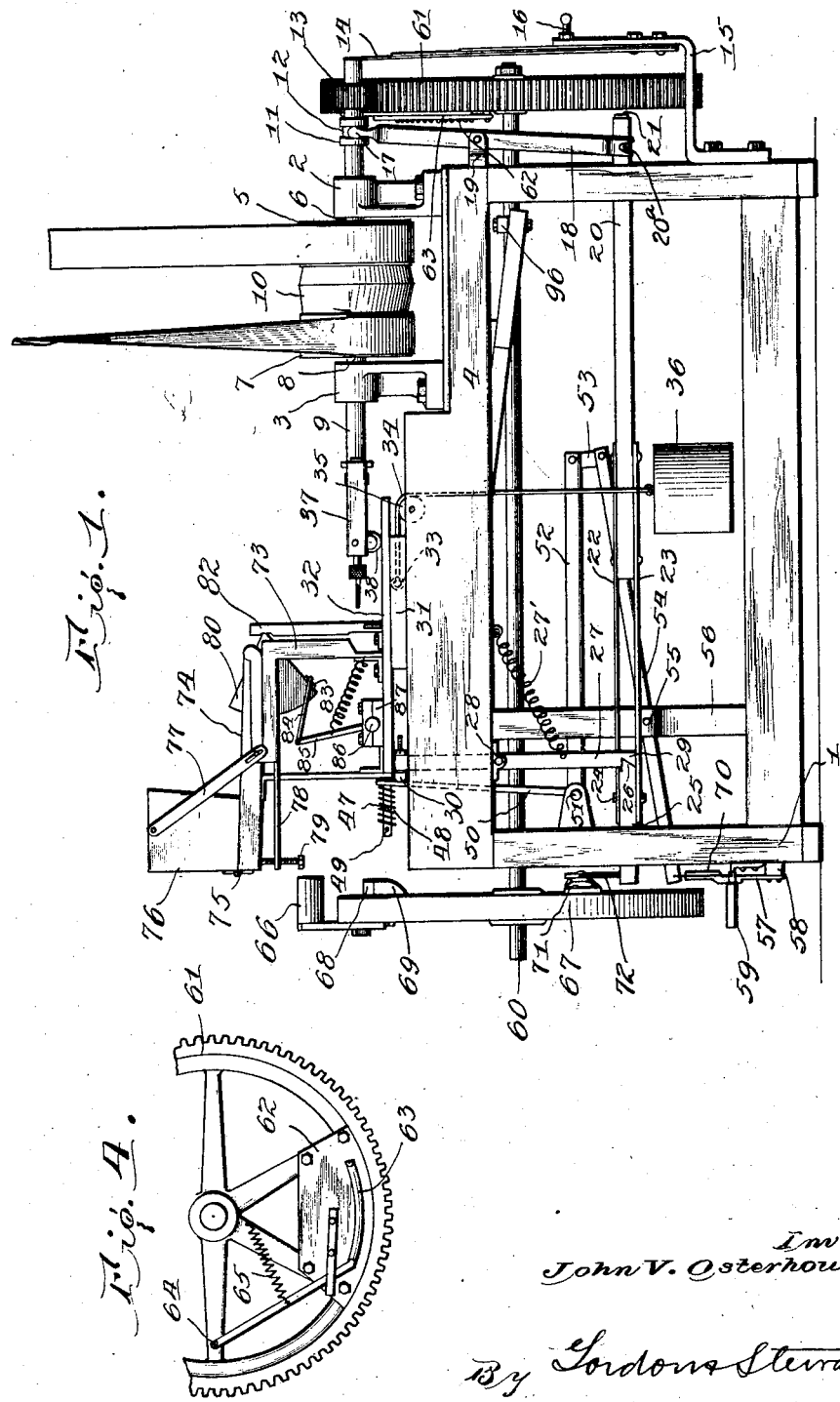

Dec. 22, 1925.
J. V. OSTERHOUT
1,566,343
NUT TAPPING MACHINE
Filed Nov. 25, 1921
3 Sheets-Sheet 2
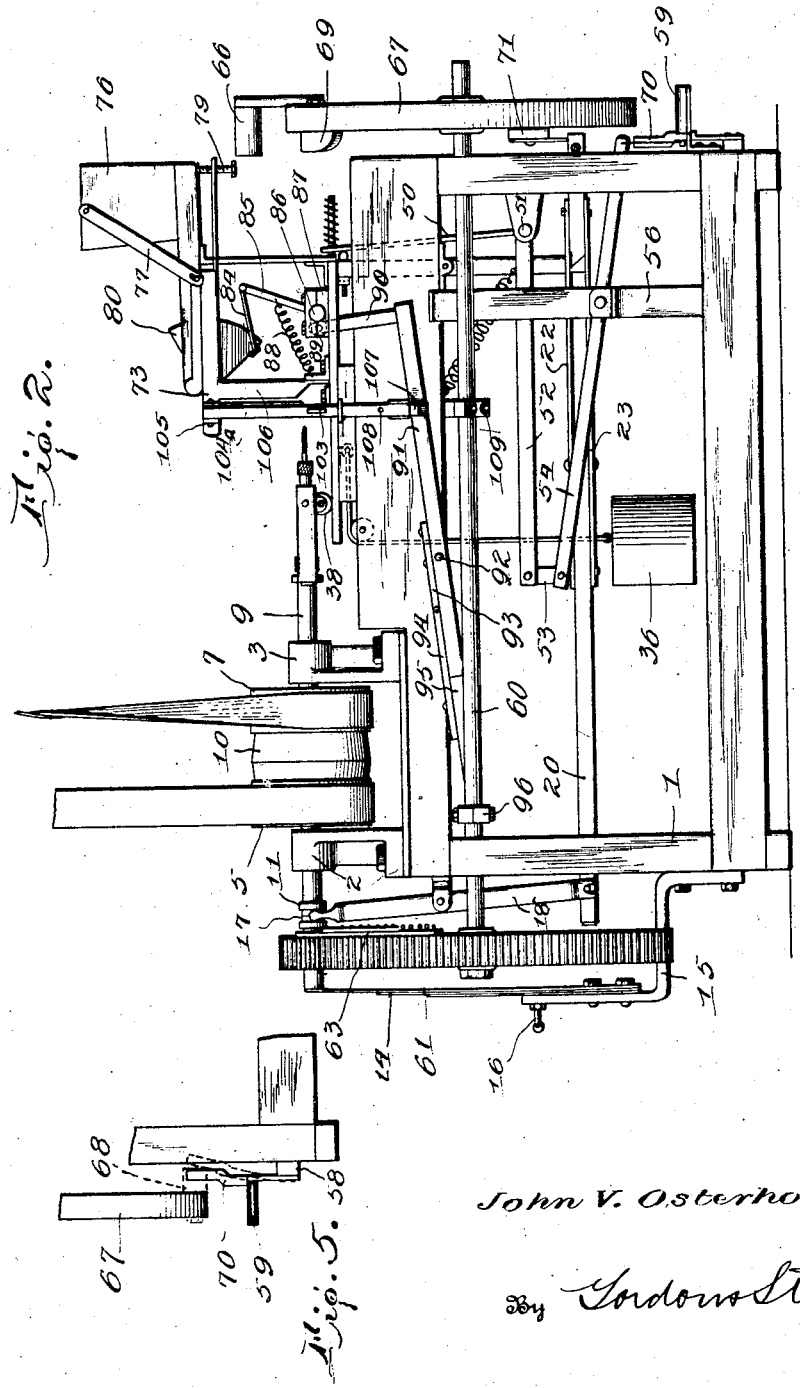
Inventor,
John V. Osterhout.
By Gordon Stewart
Attorneys.

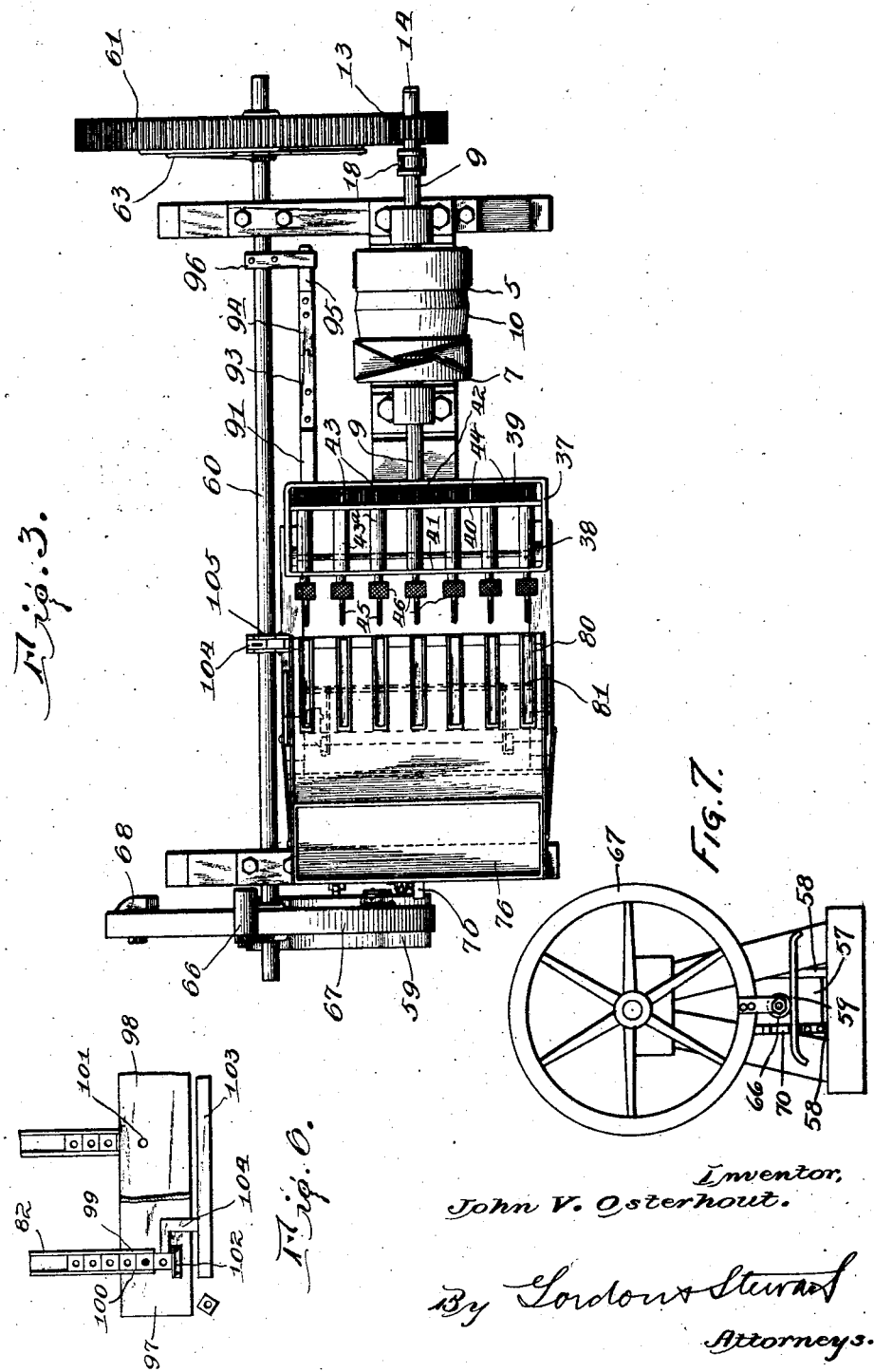

Patented Dec. 22, 1925.

1,566,343

UNITED STATES PATENT OFFICE.

JOHN V. OSTERHOUT, OF BRIDGEPORT, CONNECTICUT.

NUT-TAPPING MACHINE.

Application filed November 25, 1921. Serial No. 517,615.

*To all whom it may concern:*

Be it known that I, JOHN V. OSTERHOUT, a citizen of the United States, and a resident of Bridgeport, county of Fairfield, and State of Connecticut, have invented certain new and useful Improvements in Nut-Tapping Machines, of which the following is a full and complete specification, reference being had therein to the appended drawings.

My invention consists in certain improvements in nut tapping machines and in particular those automatically operating machines in which a plurality of nuts are tapped at one time by a gang of simultaneously operated taps. It is an object of my invention to provide means for holding a plurality of nuts during the tapping operation and for feeding the nuts to the tapping mechanism. The nuts after being tapped are ejected from the machine in a novel and efficient manner as will hereinafter appear.

A further object of my invention resides in means whereby the nut holding mechanism is advanced during the tapping operation and later retracted as the taps are withdrawn from the nuts, it being a prime requisite in the successful operation of the device that this mechanism withdraw from the taps without injury to the nuts.

Other advantages in the device will be apparent from the following description it being understood that numerous changes in minor details and materials may be made without departing from the spirit of the invention. For purposes of illustration, one form of my invention is shown in the accompanying drawings, in which—

Fig. 1 is a front elevation of the assembled machine;

Fig. 2 is a rear elevation of the same;

Fig. 3 is a plan view of the machine;

Fig. 4 is a detail of one wheel element;

Fig. 5 is a detail of the tripping mechanism,

Fig. 6 is a detail elevation of one of the nut ejecting mechanisms and

Fig. 7 is a detail elevation of the cam actuated slide and lock.

The mechanism comprised in this nut tapping machine is mounted upon a frame 1 of suitable material and serving the purpose of a rigid support. Bearing supports 2 and 3 are mounted in the top 4 of the support. These bearings each carry loosely mounted therein the hollow shaft of a pulley wheel. The pulley wheel 5 is mounted upon shaft 6 which extends through the bearing 2. This shaft 6 is hollow to form a journal for the spindle driving shaft. A second pulley wheel 7 is mounted upon a hollow journal 8 which in turn rotates within the bearing 3. The journals 6 and 8 carry the spindle driving shaft 9 which extends through the two bearings 2 and 3 and beyond the end of the supporting frame. A double cone clutch 10 is keyed or otherwise fastened to the shaft 9 between pulleys 5 and 6. Means such as lugs are provided on the clutch 10 to mesh with wheel 5 or 7 in limiting positions. Shaft 9 at its outer end carries a sleeve 11 in which a groove 12 is cut. A pinion 13 is keyed to the shaft 9 beyond the sleeve 11. The end of the shaft has a steel pivot to take the thrust of one end of a leaf spring 14 mounted upon a bracket 15 forming part of the frame. Suitable adjusting means 16 governs the tension of the leaf spring against the end of the shaft 9.

The bifurcated end 17 of a lever 18 is received in groove 12 of the sleeve 11. The lever 18 is pivoted upon a bracket 19 extending from the end of the frame. The opposite end of the lever 18 is formed as a collar receiving one end of the rod 20, a pivot pin 20ª running transversely to both the lever and the rod. The lever 20 extends beneath the frame for the full length of the latter terminating in upper and lower straps 22 and 23 respectively. These straps carry a vertical pivot pin 24 upon which is mounted a latch bar 25. This latch bar has a projecting tooth 26 at its inner end while the outer end extends beyond the frame 1.

A rocking lever 27 is pivoted at the point 28 substantially vertically with respect to the tooth 26 of the latch bar. The lower end of the bar 27 is cut away as at 29 to receive the tooth 26. The bar 27 projects above the top of the frame and carries an abutment 30 adapted for screw-threaded adjustment horizontally.

The top of the frame has a track 31 upon which moves a slide 32. The slide 32 is adapted to move longitudinally of the frame and to be drawn toward the spindles by eyelet 33, flexible strap 34 traveling on pulley 35 and acted upon by weight 36.

The forward part of the slide 32 has a horizontal upper surface which forms a track for the tapping mechanism proper.

The tapping mechanism proper includes a frame 37 mounted upon rollers 38. By means of the rollers the frame is adapted to rest on and move relatively to the slide 32. The rear portion 39 of the frame 37 receives one end of the shaft 9. Transversely of the frame and in front of the rear portion 39 is a cross bar 40 while a similar cross bar 41 forms the front of the frame 37. The shaft 9 passes through the members 39, 40 and 41. A pinion 42 is keyed to shaft 9 between the member 39 and cross bar 40. The member 39 and cross bar 40 are drilled to form bearings for a plurality of pinions 43 and 44. The pinions 43 are carried upon shafts 43ª. In the form illustrated seven of these shafts 43ª are provided to carry the nut tapping drills 45, each of which are held on the shafts by means of chucks 46. Between each two pinions 43 and between pinion 42 and the adjacent pinions 43, there is provided a pinion 44. These are shown in the present instance to be six in number. It will be evident that a greater or fewer number of taps 45 may be used with a consequent change in the number of pinions 43 and 44 which will be necessary. Since the pinion 42 is fast upon the shaft 9 the frame 37 and the contained drills will be constrained to reciprocate with the shaft 9 as the latter is moved by or against the force of the spring 14.

The rear end of the slide 32 carries a projecting bar 47 which carries a coil spring 48. This coil spring is fastened to the end of the bar by means 49. A bell crank lever 50 is pivoted upon the frame of the machine as at 51. The upper end of the bell crank lever fits loosely around the bar 47 and rests against the coil spring 48. The coil spring normally maintains the lever 50 against the abutment 30. The opposite arm 52 of the bell crank lever is connected by means of the link 53 to the rock arm 54. A pivot pin 55 supports the rock arm 54 upon the frame member 56. The free end of the rock arm 54 is pivoted to the slide 57 which moves in vertical track 58 mounted on the side of the frame. The slide 57 carries a plate 59.

Journalled longitudinally upon the rear of the frame 1 is the shaft 60. One end of the shaft 60 carries a gear wheel 61 in engagement with the pinion 13.

The gear wheel 61 has a plate 62 upon which an arcuate cam 63 is mounted. Cam 63 is pivoted to the wheel 61 at the point 64 shown in Fig. 4. The cam 63 is held by spring 65 in such manner that the cam is brought in contact with the end 21 of shaft 20 during the rotation of the gear wheel in one direction but during rotation in the opposite direction the cam 63 is deflected outward from its normal position by engagement with the shaft 20, the spring 65 yielding the necessary amount.

The opposite end of the shaft 60 carries a cam 66 in the form of a roller mounted beyond the periphery of the wheel 67. The roller 66 contacts with the plate 59 of the slide 57. A release 68 is mounted upon the side of the wheel 67 and has a cam surface 69 engaging the tooth 70, as shown in Fig. 5. The tooth 70 is pivoted at its lower end to the guide 58 and is held in advanced position by its own resilience. The tooth springs outwardly over the plate 59 and locks the latter in its lower-most position after it has been forced down by the roller 66. The wheel 67 also carries a cam 71 having an eccentric face 72. This cam is adapted to strike the side of the free end of the latch bar 25 and release tooth 26 from the engaging end 29 of the bar 27. The lateral movement of the bar 25 is resisted by a spring not shown but which functions normally to bring the tooth 26 in the same plane with the bar 27.

Upon slide 32 is mounted a feed support frame 73, to the front end of which is pivoted a platform 74. The rear of the platform has pivoted at its edge by means of hinge 75 a hopper 76. Suitable supports 77 are adjusted at their lower ends as shown to maintain the hopper 76 in vertical position irrespective of the inclined position of the platform 74. A rear extension 78 on the feed frame carries an adjusting screw 79 upon which the rear of the platform 74 rests and by which the latter may be given a desired slope. The hopper 76 discharges from the bottom over the entire surface of the platform 74.

A plurality of nut feeding sectors 80 are pivoted at the forward part of the support 73. One sector is provided for each drill carried by the frame 37. The upper edge of each sector 80 has a runway 81 adapted to permit the passage of the nuts one at a time from the platform 74 to the nut feeding chutes. These nut feeding chutes 82 are disposed vertically to receive the nuts from the forward end of the sector 80 and to direct the same downwardly to the nut holding means. The sectors 80 are connected by a cross bar 83. A link 84 runs from the cross bar 83 to the upper end of rock arm 85. The rock arm 85 is mounted upon a rock shaft 86 suitably journalled in bearings 87 on the slide 32. A spring 88 serves to draw arm 85 forward and thus maintain the sectors 80 normally depressed. The rock shaft 86 has a radial lug 89 against which the vertical arm 90 of lever 91 is adapted to press and to which it is linked. Lever 91 is pivoted to the frame work at 92. A strap 93 is bolted to the top of lever 91, and forms part of a strap hinge having a corresponding strap 94 bolted to an extension rod 95 beyond the end of the lever 91. This extension rod projects in the path of the cam 96 adjustably mounted on the driving shaft 60. With this structural arrangement the downward stroke of cam 96 transmits power through the various linkages to the sectors 80 and provide step by step feeding of the chutes 82. When not acted upon by cam 96 the lever 91 rests upon outward turned upper end of member 56.

Reverse motion of shaft 60 and cam 96 will lift extension 95 around its hinge, without operating the lever 91.

Means for holding the nuts during the tapping operation and for ejecting them afterwards, is shown in Fig. 6. The jig for the nuts consists of a rear bar 97 and front bar 98 extending across the slide 32 at the foot of the feed chutes 82. These bars are spaced the distance of the thickness of a nut and have guide flanges 99 and 100 forming extensions at the base of each feed chute 82. The flanges extend beneath the apertures 101 through which the taps are operated. In this manner the flanges hold the nuts stationary during the tapping operation. Beneath each chute 82 is placed a transverse resting plate 102 so spaced that one nut may rest upon the plate while a second nut is being tapped. A cross bar 103 extends beneath the bars 97 and 98. A series of ejectors 104 are formed on the bar 103 to project between the bars 97 and 98 and to engage the nuts resting upon the plates 102. The ejector 104 is so arranged that it ejects the completed nuts in each movement of the bar 103. The bar 103 is offset from the space between the bars 97 and 98 in order to provide a clear passage for the nuts to drop from the resting plates 102 into a delivery trough. It will be obvious that similar holding and ejecting means are provided beneath each chute 82.

The bar 103 is pivoted at one end beyond the side of slide 32 to a lever 104$^a$. This lever 104$^a$ is carried upon a pivot 105 on the frame 73. A spring 106 serves to force the lever 104$^a$ outwardly from the frame. The lower end of the member 104$^a$ carries a pivoted latch 107, the upper end of which is held away from the lever 104$^a$ by means of spring 108. The lower end of latch 107 projects within the path of movement of the adjustable cam 109 upon shaft 60.

In operating the machine above described, a supply of nuts to be tapped is fed into the hopper 76. These nuts may be rectangular or hexagonal and in either case spread out upon platform 74. The sectors 80 pick up the nuts one at a time and deliver them into the feed chutes 82 by which they are fed between flanges 99 and 100. The first nut to pass down the feed chute rests upon the plate 102. The succeeding nut is held between the flanges 99 and 100 so that its center is opposite the holes 101 through which the tap travels. The nut is therefore held against rotation during the forward movement of the tap and also during the retraction of the tap. At an appropriate time in the forward movement of the tap and after the nut has been engaged by the tap, the support by the preceding nut becomes unnecessary. Cam 109 operates at this moment to reciprocate bar 103 carrying the ejecting arm 104 laterally into engagement with the lowermost nut. This nut is pushed off of plate 102 by ejector 104. As soon as cam 109 has passed beyond the latch 107, arm 104$^a$ springs back to retract the ejector 104. This permits the next nut to drop down upon plate 102 as soon as it is released in the retracting movement of the tap. In this manner, each nut forms a stop to position the succeeding nut until the latter is engaged by the tap.

Assuming a nut in position between the flanges 99 and 100, it will be evident that the slide 32 is drawn forward by the pull of weight 36. This forward movement of slide 32 feeds the nut as fast as the same is tapped by taps 45 and the nut may be said to travel upon the tap 45. During this operation lever 18 is in the position shown in Fig. 1 whereby clutch 10 is driven by pulley wheel 5 and corresponding rotation given to the shaft 9. This advances the taps in the nuts. The pinion 13 on shaft 9 is constantly in mesh with gear wheel 61. The weight 36 is sufficient to overcome the influence of spring 14 and to maintain operative connection between the clutch and the pulley wheel. At the end of the cutting movement cam 66 will have been brought in contact with shoe 59 and will force the latter down. As the shoe 59 is forced down it carries the slide over the latch 70. The slide is, therefore, held down after the cam 66 passes out of contact of shoe 59. As the slide moves down it serves to rock the bell crank lever 50 through the links 54, 53 and 52. This movement of the bell crank lever 50 compresses spring 48 and overcomes the pull of weight 36. The slide 32 is therefore held forward merely by the engagement of the nut with the tap. Simultaneously with the engagement of cam 66 and shoe 59, the end bearing of rod 20 passes over the cam track 63 on gear wheel 61. This locks shaft 9 in its operating relationship with pulley 5 and continues feeding the tap through the nut. As cam 66 passes beyond shoe 59 the bar 20 passes cam 63. Spring 14 is now free to move shaft 9 to the left of Fig. 1. This releases clutch 10 from pulley 5 and throws clutch 10 into engagement with the reverse pulley 7.

As shaft 9 rotates in a reverse direction the tap begins to back out of the nut. This also permits slide 32 to move backward under the influence of spring 48 until the slide 32 is brought into contact with bell crank lever 50. As soon as the taps are out of the nuts the latter drop down to rest upon the plates 102, bringing other nuts opposite the taps.

As bell crank 50 moves back it is followed by the upper end of lever 27 since the lower end of the latter is drawn in the opposite direction by a spring 27' connecting it with the frame. This movement of lever 27 continues until latch 26 is released to spring out in front of the lower end 29 of the lever.

Latch 70 is now engaged by cam 68 on wheel 67. Latch 70 in its backward movement releases plate 59 with the result that slide 32 is drawn forward again by weight 36. This forward movement brings bell crank 50 against the upper end 30 of lever 27 and transmits movement through the latter to the shaft 20, pulling the latter back. As shaft 20 moves to the left lever 18 is rocked and shaft 9 therefore disconnected from pulley 7. This movement continues until shaft 9 overcoming the force of spring 14 engages clutch 10 with pulley 5 and commences the feeding rotation of the taps.

The forward movement of slide 32 is limited by the position of the abutment 30 which in turn is now held by latch 26. It follows that a forward feeding movement is being given the tap although the shaft 9 does not move. Also slide 32 is held in idle position. This period is sufficient for a predetermined number of rotations of the taps generally found to be three in number. After the taps have rotated several times cam 72 releases latch 26 and permitting lever 27 to rock clock-wise under the influence of weight 36 and thus the jig is advanced into engagement with the taps. Spring 27' is provided solely for the purpose of causing lever 27 to follow bell crank lever 50 and thus set latch 26.

The several rotations of the taps prior to engagement between the latter and the nuts is desirable in order to insure that the rotation in the reverse direction will completely back the taps out of the nuts.

The tapping operation above described will continue until cam 66 again passes over shoe 59 and detracts the jig mounted on slide 32. This, of course, accompanied by a forward movement of the taps under the impulse of spring 14 causing the reversing of the taps as soon as shaft 20 passes cam 63.

When once started the machine operates continuously without further attention, the various periods of operation being controlled by the setting of the cams on wheel 67.

While I have shown one preferred form of my invention, it will be evident that various changes in structural details and equivalents may be made without departing from the spirit of the invention as defined in the following claims:

1. In a device of the class described, a shaft carrying a tap, means for rotating said shaft alternately in tapping and reversing directions, a slide, slide advancing means adapted to cause the shaft to rotate in the tapping direction, a cam maintaining the rotation of the tap after the slide is retracted, a spring for reversing the direction of rotation of the shaft, and means including a lever and cooperating latch operable by the advancing movement of the slide to rotate the shaft in the cutting direction.

2. In a device of the class described, a shaft carrying a tap, means for rotating said shaft alternately in tapping and reversing directions, a slide, slide advancing means adapted to cause the shaft to rotate in the tapping direction, a cam maintaining the rotation of the tap after the slide is retracted, a spring for reversing the direction of rotation of the shaft, means including a lever and cooperating latch operable by the advancing movement of the slide to rotate the shaft in the cutting direction, and slide releasing means controlled by the rotation of the shaft.

3. In a device of the class described, a jig including spaced parallel plates having apertures for the passage of a tap, walls forming a passageway terminating opposite said apertures, a transverse wall spaced beneath said passageway and an ejector movable transversely of the passageway between the latter and the transverse walls.

4. In a device of the class described, nut-feeding means, nut-holding means, a slide carrying said means, a frame movable on the slide toward and from the nut-holding means, a plurality of taps carried on said frame, means for advancing and retracting said frame, means for rotating said taps simultaneously and means for reversing the direction of rotation of said taps.

In testimony whereof, I have hereunto affixed my signature.

JOHN V. OSTERHOUT.